(12) United States Patent
Ellenby

(10) Patent No.: US 6,173,239 B1
(45) Date of Patent: Jan. 9, 2001

(54) APPARATUS AND METHODS FOR PRESENTATION OF INFORMATION RELATING TO OBJECTS BEING ADDRESSED

(75) Inventor: Thomas Ellenby, San Francisco, CA (US)

(73) Assignee: Geo Vector Corporation, San Francisco, CA (US)

( * ) Notice: Under 35 U.S.C. 154(b), the term of this patent shall be extended for 0 days.

(21) Appl. No.: 09/163,746

(22) Filed: Sep. 30, 1998

(51) Int. Cl.⁷ .................................................. G01C 11/26
(52) U.S. Cl. ................................................ 702/150; 707/1
(58) Field of Search ................................... 702/150, 152; 707/1; 701/207, 208, 213; 342/357.06

(56) References Cited

U.S. PATENT DOCUMENTS

| | | | |
|---|---|---|---|
| Re. 28,847 | 6/1976 | Vizennor | 350/302 |
| 2,994,971 | 8/1961 | Meisenheimer et al. | 35/44 |
| 3,729,315 | 4/1973 | Conklin | 96/27 |
| 3,769,894 | 11/1973 | Conklin | 95/85 |
| 3,923,370 | 12/1975 | Mostron | 350/55 |
| 4,425,581 | 1/1984 | Schweppe et al. | 358/148 |
| 4,489,389 | 12/1984 | Beckwith et al. | 364/522 |
| 4,600,200 | 7/1986 | Oka et al. | 273/313 |
| 4,645,459 | 2/1987 | Graf et al. | 434/43 |
| 4,684,990 | 8/1987 | Oxley | 358/183 |
| 4,736,306 | 4/1988 | Christensen et al. | 364/513 |
| 4,835,532 | 5/1989 | Fant | 340/728 |
| 4,855,822 | 8/1989 | Narendra et al. | 358/103 |
| 4,940,972 | 7/1990 | Mouchot et al. | 340/747 |
| 4,970,666 | 11/1990 | Welsh et al. | 364/522 |
| 5,034,812 | 7/1991 | Rawlings | 358/108 |
| 5,072,218 | 12/1991 | Spero | 340/980 |
| 5,115,398 | 5/1992 | De Jong | 364/443 |
| 5,182,641 | 1/1993 | Diner et al. | 358/103 |
| 5,252,950 | 10/1993 | Saunders et al. | 345/9 |
| 5,296,854 | 3/1994 | Hamilton et al. | 340/980 |
| 5,311,203 | 5/1994 | Norton | 345/7 |
| 5,353,134 | 10/1994 | Michel et al. | 359/52 |
| 5,394,517 | 2/1995 | Kalawsky | 395/129 |
| 5,410,649 | 4/1995 | Gove | 395/161 |
| 5,467,444 | 11/1995 | Kawamura et al. | 395/141 |
| 5,479,597 | 12/1995 | Fellous | 395/154 |
| 5,528,232 | 6/1996 | Verma et al. | 340/825.54 |
| 5,528,518 | * 6/1996 | Bradshaw et al. | 364/561 |
| 5,682,332 | * 10/1997 | Ellenby et al. | 364/559 |
| 5,742,521 | * 4/1998 | Ellenby et al. | 364/550 |
| 5,815,411 | * 9/1998 | Ellenby et al. | 364/559 |
| 5,825,480 | * 10/1998 | Udagawa | 356/138 |
| 5,902,347 | * 5/1999 | Backman et al. | 701/200 |
| 5,995,903 | * 11/1999 | Smith et al. | 701/211 |
| 6,021,374 | * 2/2000 | Wood | 701/301 |
| 6,023,278 | * 2/2000 | Margolin | 345/419 |
| 6,024,655 | * 2/2000 | Coffee | 473/407 |
| 6,029,173 | * 2/2000 | Meek et al. | 707/102 |
| 6,046,689 | * 4/2000 | Newman | 340/996 |
| 6,052,645 | * 4/2000 | Harada | 701/212 |
| 6,064,398 | * 5/2000 | Ellenby et al. | 345/435 |
| 6,064,942 | * 5/2000 | Johnson et al. | 701/213 |

\* cited by examiner

Primary Examiner—Patrick Assouad
(74) Attorney, Agent, or Firm—Page Lohr

(57) ABSTRACT

Systems are arranged to provide a user information which relates to objects of interest. A user may point a device toward an object to address it. The device determines which objects are being addressed by reference to an internal database containing preprogrammed information relating to objects. Information relating to objects being addressed can then be presented at a user interface. A device of the system may include a point reference, a direction reference, a position determining support, attitude determining support, a computer processor and database, and a user interface. Methods of systems include the steps of addressing an object, determining position and attitude, searching a database, and presenting information to a user.

8 Claims, 15 Drawing Sheets

APPARATUS AND METHODS FOR PRESENTATION OF INFORMATION RELATING TO OBJECTS BEING ADDRESSED

BACKGROUND OF THE INVENTION

1. Field

The following invention disclosure is generally concerned with devices and technique for presenting recorded information relating to objects and specifically concerned with presenting recorded information relating to objects having an association with a particular location.

2. Prior Art

Systems have been devised to display images of objects which may be in the field-of-view of a vision system. Images may be formed in response to a determination of position and attitude of the vision system which locates the field-of-view with respect to objects being addressed. Details may be fully appreciated in consideration of U.S. Pat. No. 5,625,765; 5,682,332; and 5,742,521.

While these systems are highly useful and sophisticated, they may require complex imaging apparatus and technique forming composite images which are aligned to actual objects.

While the systems and inventions of the prior art are designed to achieve particular goals and objectives, some of those being no less than remarkable, these inventions have limitations which prevent their use in new ways now possible. These prior art inventions are not used and cannot be used to realize the advantages and objectives of the present invention.

SUMMARY OF THE INVENTION

Comes now, Thomas Ellenby with an invention of an information system including devices and methods of presenting information relating to an object being addressed.

The present invention includes devices and methods for presenting information relating to objects having an association with a particular geometry and location. Specifically, devices are arranged with a pointing reference and user interface. A device which is pointed toward an object known to a computer database, responds by determining which objects are being addressed and presenting information which relates to the objects at the interface.

After a device of the invention is pointed towards an object, the device makes a determination of the position and attitude of the device. A reference address indicator associated with the determined position and attitude is defined and used in a search of a database. The database comprised of data elements having identifiers or descriptors associated with position and other spatial definition may form a geometric intersection with the reference address indicator. The search produces output which includes information about objects which are being addressed by the device. The information is presented to a user via a user interface.

OBJECTIVES OF THE INVENTION

It is a primary objective of the invention to provide systems for presenting information.

It is further an objective to provide systems for addressing an object and presenting information relating to the object.

It is further an objective to provide systems for addressing an object, identifying the object and presenting information relating to the object.

It is further an objective to provide systems for addressing an object, recalling information relating to the object by way of a spatial reference and presenting information relating to the object being addressed.

A better understanding can be had with reference to the detailed description of preferred embodiments and with reference to the appended drawings. These embodiments represent particular ways to realize the invention and are not inclusive of all ways possible. Therefore, there may exist embodiments that do not deviate from the spirit and scope of this disclosure as set forth by the claims, but do not appear here as specific examples. It will be appreciated that a great plurality of alternative versions are possible.

BRIEF DESCRIPTION OF THE DRAWING FIGURES

These and other features, aspects, and advantages of the present invention will become better understood with regard to the following description, appended claims and drawings where:

Figure 1:
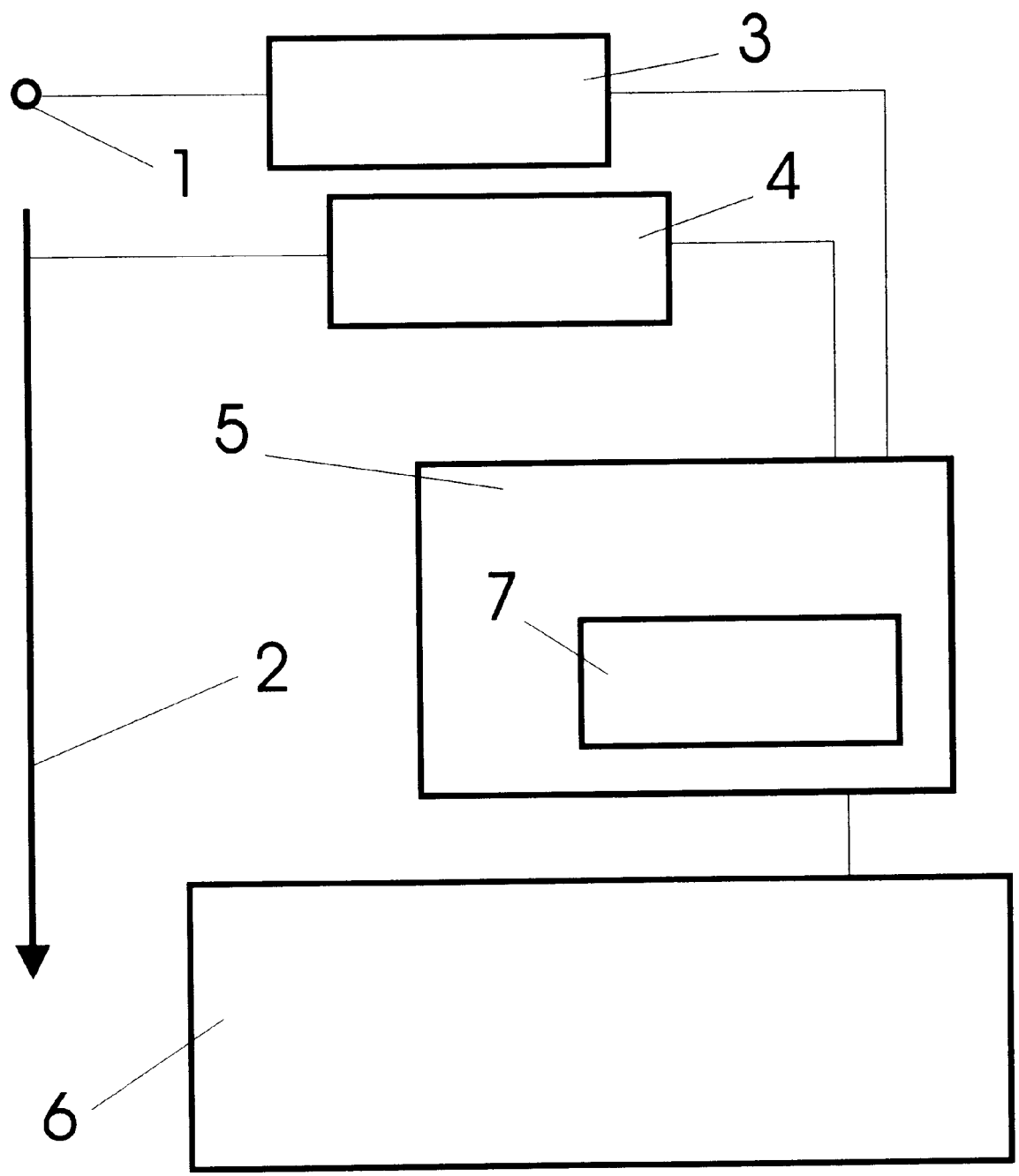
FIG. 1 is a block diagram illustrating major elements of a device of the invention.

FIGS. 5–15 similarly show geometries of importance.

PREFERRED EMBODIMENTS OF THE INVENTION

In accordance with each of the preferred embodiments of the invention, there is provided an apparatus for and method of presenting information relating to an object being addressed. It will be appreciated that each of the embodiments described may include both an apparatus and method and that the apparatus and method of one preferred embodiment may be different than the apparatus and method of another embodiment.

Throughout this disclosure, reference is made to some terms which may or may not be defined in popular dictionaries exactly as they are defined here. To provide a more precise disclosure, the following terms are presented with a view to clarity so that the true breadth and scope may be more readily appreciated. Although every attempt is made to be precise and thorough, it is a necessary condition that not all meanings associated with each term can be completely set forth. Accordingly, each term is intended to also include its common meaning which may be derived from general usage within the pertinent arts or by dictionary meaning. For purposes of this disclosure:

A geometric descriptor is a mathematical definition of a geometric body. A geometric descriptor of the invention is used in association with an object which may be addressed by systems of the invention.

An information element is a database record which relates to a particular object of interest. An information element comprises many forms of multi-media data including but not limited to: text, audio recordings, video streams, pictures, photographs, icons, Java applets, etc. In addition, each information element has associated therewith a geometric descriptor.

Address is a term used herein as a verb, most commonly with the gerund -ing, to indicate a relationship between a device of the invention and an object; the object being the subject of the address. A device of the invention which is pointing at an object is said to be 'addressing' the object.

An address indicator may be a geometric body, examples include vectors and cones, which has a pointing direction associated therewith. In addition to a reference point and reference pointing direction, some address indicators, for example a cone, subtend a solid angle or otherwise have spatial extent.

A range gate is a geometric segment which is a subset of an address indicator having a first endpoint or planar region at some minimum distance from a point reference and a second endpoint or planar region at some maximum distance from the same point reference. objects refer to any element which may be of interest to a user. An object may be a real tangible object or may be a figurative element in space. The term 'object' should be read in a liberal sense. Although buildings and mountains suggest concrete forms of objects, objects for purposes of this disclosure include abstract forms as well. For example, the region of airspace over an airport which may be restricted is considered an 'object'. Indeed any region of space may considered an object whether is actually contains a tangible object therein or not.

In simplest versions of the invention, apparatus include the following elements as described herefollowing.

Geometric References

Devices of the invention include a point reference and a directional reference. These may be mere structural constructs. The actual point and directional references may or may not correspond to any tangible object or element of the device. Alternatively, they may be collocated with actual physical elements of the device. In either case, an important relationship is made between them and a position and attitude determining means which are also included in devices of the invention.

Position Determining Means

A position determining means is arranged to measure the position of the point reference. Since in many embodiments of the invention the position determining means is a global positioning system GPS receiver, the point reference lies at the center of the sphere which is defined by the resolution limits of the positioning system. For practical purposes, a handheld receiver which includes a GPS antenna may be said to have the point reference within the handheld unit. The position determining means therefore measures the position of the handheld unit. Many forms of alternate positioning systems may be used to accomplish the identical task. The particular positioning system employed may be chosen for a specific task at hand, for example a global positioning system would not be appropriate for a small space such as a warehouse so a radio triangulation technique may be preferred. The essence of the invention is not changed by the particular choice of positioning system. Therefore versions of the invention should not be limited to one particular type of positioning system. The limitation described by 'position determining means' is met when the position of the point reference is measured and made available to a computer processor. Therefore, by use of the term "position determining means" it is meant that any conceivable means for determining the position of a point reference and making that position known to a computer is anticipated. Experts will recognize that there are many thousands of possible ways of determining position and it will not serve a further understanding of the invention to attempt to catalogue them here. The reader will appreciate that the broadest possible definition of "positioning determining means" is intended here.

Attitude Determining Means

Systems of the invention also include an attitude determining means. An attitude determining means is arranged to determine the pointing direction or orientation of a directional reference. In simple versions, an electronic compass will serve as an attitude determining means. More sophisticated versions will include an attitude determining means which is operable for measuring inclination as well as direction in a horizontal plane. Although an electronic flux gate compass or laser gyroscope system may be used in certain versions of the invention, it does not improve the description to limit the attitude determining means to any particular device. Similar to the position determining means described above, the limitation described as 'attitude determining means' is filly met by any device or systems which may be used to determine the attitude of a directional reference and make that information known to a computer processor.

User Interface

A user interface of the invention serves to convey information to a user of the device. A simple speaker driven by computer audio systems is operational for producing audio information and description to a user. Similarly, a display screen driven by video systems of a computer functions to present video or graphic information to a user. Although a display screen and speakers are preferred devices for interfacing with a user, other systems include non-display type visual systems such as simple light emitting diodes, or non-speaker audio systems such as buzzers, tactile outputs such as vibrating systems, et cetera. In all cases, a user interface includes a transducer which is electronically driven by the computer which produces some physical disturbance which can be detected by a user's senses.

Computer Processor

In addition, systems of the invention include a computer programmed to execute specific routines. In particular, a computer is arranged to receive inputs from the position and attitude determining means. From these inputs, the computer defines a geometric body as an address indicator in association with the device reference point and pointing direction. From this geometric body definition, the computer performs a database search and determines if any of the geometric objects described in the information element geometric descriptors intersects the address indicator. Information elements which are determined to intersect said address indicator has data associated therewith which may be recalled and played back to the user interface as appropriate and in agreement with other criteria which may be selected.

Database

In systems of the invention a database is arranged to accommodate data relating to objects of interest. Data relating to objects is prepared and stored in a predetermined and well organized fashion. The data may be stored in many formats and configurations and may be of the nature sometimes referred to as 'multi-media'. A database of the invention is comprised of a plurality of information elements. Each information element relates to a particular object which may be of interest to users of devices of the invention. Each information element contains a descriptor which describes a geometry and location relating to the object for which the stored information pertains.

A geometric descriptor is a definition set for a specific geometry including position. For example, in a Cartesian coordinate system, a sphere may have its center at a point $(X, Y, Z)=(2, 5, 9)$ while having a radius of 7 units. Thus the sphere and all of the points within the sphere's boundary are completely described. A geometric descriptor may describe a geometry which includes: a single point; alternatively, a polygon; which defines a planar region; a solid such as a sphere; or even a three dimensional object of arbitrary shape. Thus the rules which perfectly describe those geometries which are well known in the sciences are used in geometric descriptors of the invention. In all cases, a geometric descriptor includes at least one point and more frequently includes a set of many points.

Methods of the invention are best described as being comprised of the follows steps.

In a first step, an object is addressed. To address an object, the device pointing reference is merely pointed toward the object. The device is necessarily pointing in some direction at all times. Although it is not a necessity that the device be pointing to an object known to the database, the device is always pointing at something and thus it is said that it is "addressing" something at all times.

In a step to be performed after the first step, the position of the device reference point is determined. A GPS employed locally at the device operates to measure the global position of the reference point. Although convenient measurement units might be latitude, longitude and altitude, others similarly provide workable solutions. Data from the position determining step is passed to the computer processor.

In a further step to be performed after the first step, the attitude of the device directional reference is determined. A compass may be used to determine which direction the device pointing reference is being pointed. Data from the attitude determining step is similarly passed to the computer processor.

Data received at the computer processor from the position and attitude determining means is used to define an address indicator. A search of database information elements is commenced. A search operation reads database geometric descriptors and performs a coincidence test to see if an address indicator intersects any of the points in a geometry described. Items meeting that criteria are recalled for further processing and presentation at a user interface.

A more complete understanding can be realized in consideration of the drawing figures with reference numerals as follows. FIG. 1 illustrates a block diagram of major components of devices of the invention. A point reference 1 is a geometric construct to which measurements of position are directed. The point may correspond to an actual device such as a GPS antenna or may alternatively be merely a point in space having a convenient location within a physical device. A directional reference 2 similarly forms a geometric construct at a device of the invention but is otherwise arbitrary with respect to any physical element or part of a device of the invention. A position determining means 3 is in communication with the point reference and is arranged to measure its position. The position determining means is further in communication with a computer. The position measurement is made without regard to any particular coordinate system in various versions of the invention but some versions using GPS devices preferably use a latitude, longitude and altitude scheme which allows one to define position anywhere on or above the Earth's surface. Determination of position within a coordinate system is the essence of the function performed by the device without regard for any coordinate system chosen for convenience.

An attitude determining means 4 is arranged in communication with a directional reference 2 and with a computer. The attitude determining means measures the pointing direction of the directional reference and reports that information to the computer processor.

A computer processor 5 is coupled to and receives measurement data from position and attitude determining means. The computer is further connected to a user interface 6 and presents information to a user by way of the interface. The computer includes a database 7 which may contain preprogrammed information.

Figure 2:
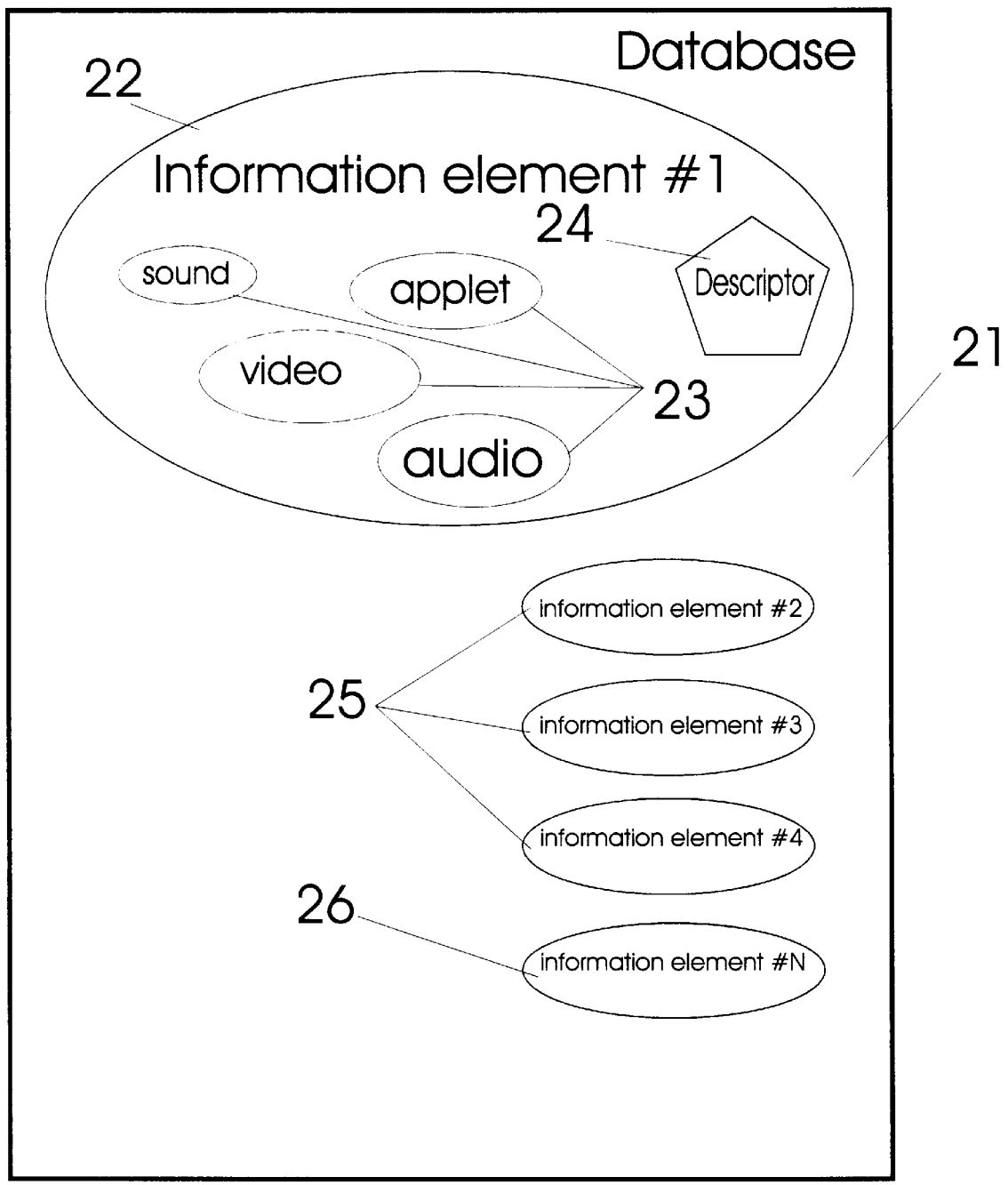
FIG. 2 is a block diagram showing the configuration of a database of the invention.

Now, with reference to FIG. 2 the database may be more precisely defined. A database 21 of the invention has a special construction. The database may include a great plurality of basic units each referred herethroughout as an information element 22. An information element may contain stored information in various formats 23. Each information element contains a descriptor 24 which defines a geometric body of interest. Additional information elements 25, each having their own descriptors and stored information, further make up the database. The database is comprised of any number of information elements the last element being the $N^{th}$ element 26.

The above described elements, when assembled as directed, form a device of the invention which is preferably integrated into a small handheld machine. A sturdy case formed of durable plastic operates to contain the assembly and allows a user easy access to functions associated therewith.

Figure 3:
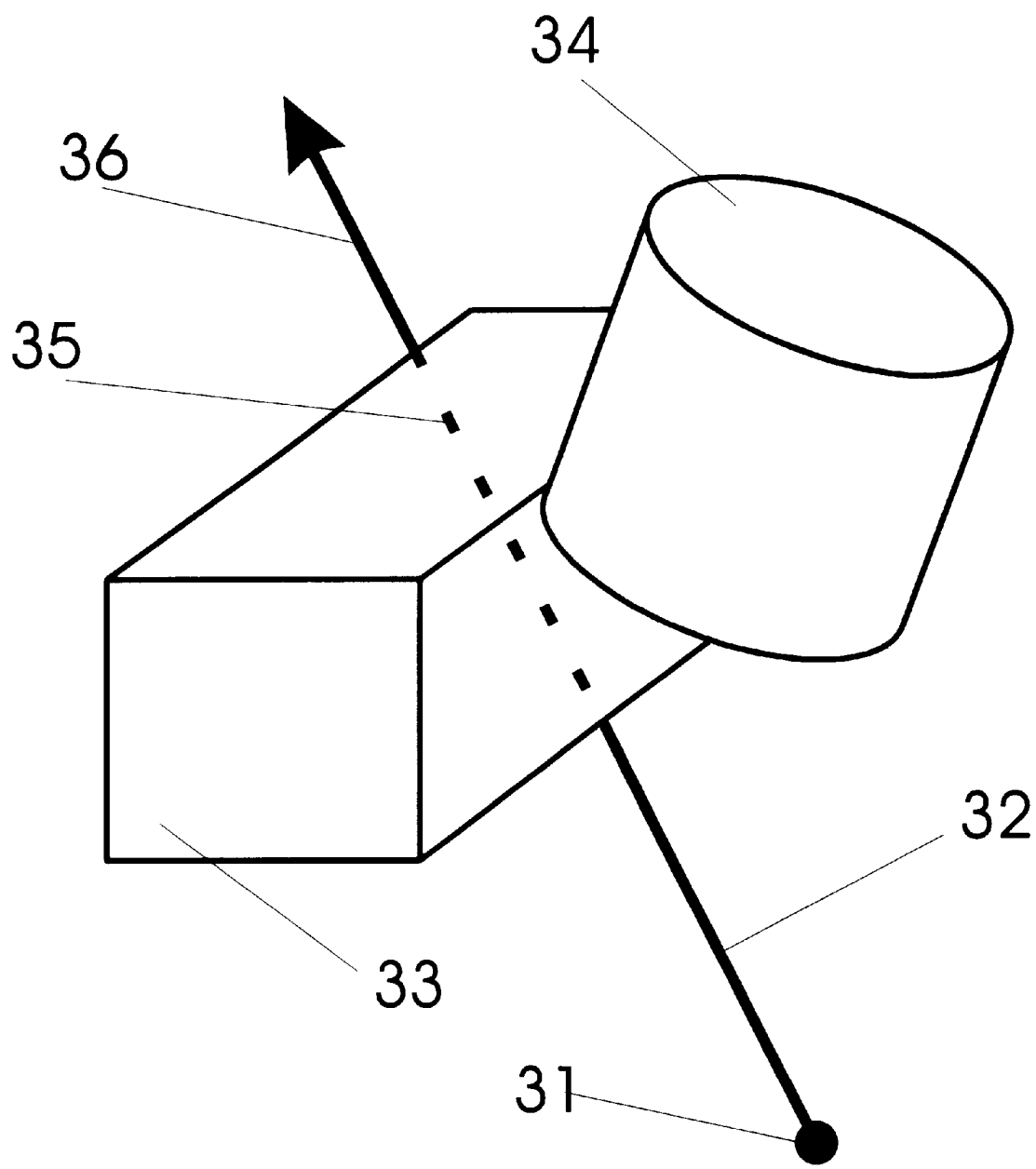
FIG. 3 is a geometric construct of interest.

In consideration of the above described arrangement and the following procedural description with reference to additional drawings, one will now better appreciate operation of some preferred devices of the invention. Drawing FIG. 3 illustrates a simple geometric construction showing a point reference 31, a directional reference 32, a rectangular cylinder 33 and a circular cylinder 34. A portion of space 35 indicated by a dotted line is shared by the rectangular cylinder and an address indicator 36. The address indicator, in this case a simple vector, has an endpoint coincident with the point reference and colinear with the direction reference. Having full geometric definition of the vector, and the cylindrical objects, a computer routine is executed to determine which objects are intersected by the vector and which are not. In the case of FIG. 3, the square cylinder is intersected by the vector but the circular cylinder is not. A device having a reference point 31 and directional reference 32 is said to be addressing the square cylinder. A computer having programmed information as to the location and shape of the cylinders can tell when a vector is intersecting the space of interest and when it is not. This fact depends on the condition that the cylinders remain stationary after the computer is programmed. The computer only needs the preprogrammed information and a measurement of the device point and direction references. The computer does not require input from any real object which may be associated with the space of interest and does not need to detect or probe it in any way.

For example if the square cylinder 33 is associated with a hotel known by the computer, the hotel is implicitly addressed whenever the device addresses the square cylindrical space. If a construction crew removes the hotel and the computer is not updated, the computer still assumes the presence of the building because it is a necessity that the space defined by the information element (hotel) geometric descriptor remain despite the actual presence, or lack of presence, of the building therein.

Accordingly, devices of the invention merely determine what space is being addressed and imply that particular objects are being addressed by way of the association of objects to spatial definitions or geometric descriptors. The mere fact that information contained in the database is accurate suggests and implies the presence of the hotel. It is the geometric descriptor which is preprogrammed into the computer which dictates if an intersection exists or not. The actual presence of an object does not affect whether the device is addressing it or not. It is useful to point out that one may generally rely on a hotel remaining in its set position.

One may rely on this technique for most items of interest. For example, the Empire State Building presently occupies a space which is well defined. It is a very reliable fact that the Empire State Building will similarly occupy that same space tomorrow. A device of the invention which is pointed at the Empire State Building, the position of the device and attitude being measured and defining an address vector, can reasonably deduce that the building is there. In this way, devices of the invention 'know' what they are addressing simply by measuring their own position and attitude and comparing that information with information in a database.

Figure 4:
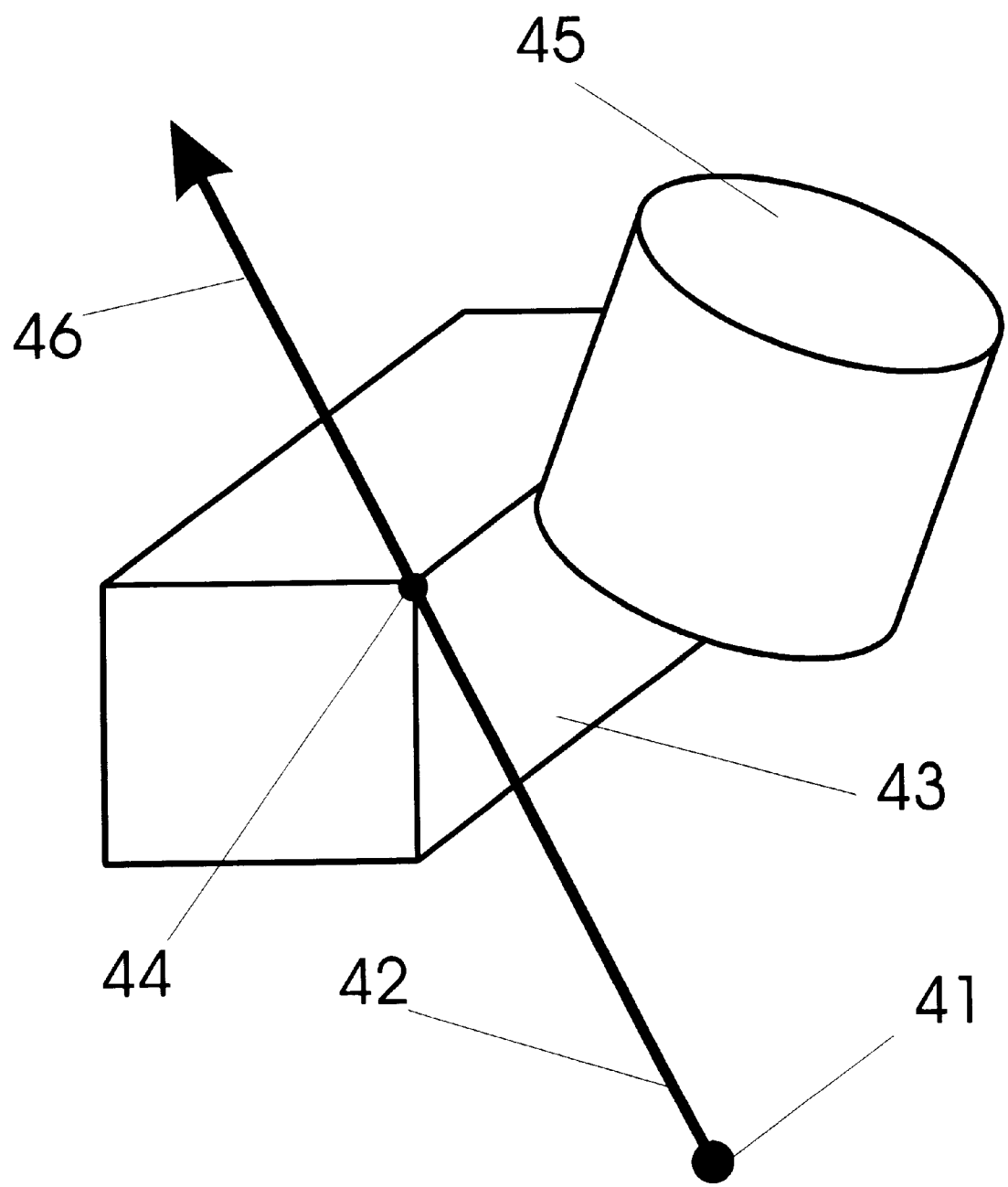
FIG. 4 shows a similar geometric construct which illustrates an important geometry.

For purposes of this disclosure, an intersection of only one point is sufficient to have the address vector be coincident or to have an intersection with the geometric object. FIG. 4 illustrates a scheme whereby the vector defined by the reference point 41 and the reference direction 42 is coincident with the square cylinder 43 at a single point 44. The circular cylinder 45 is not intersected by the vector and is not said to be coincident therewith.

Figure 5:
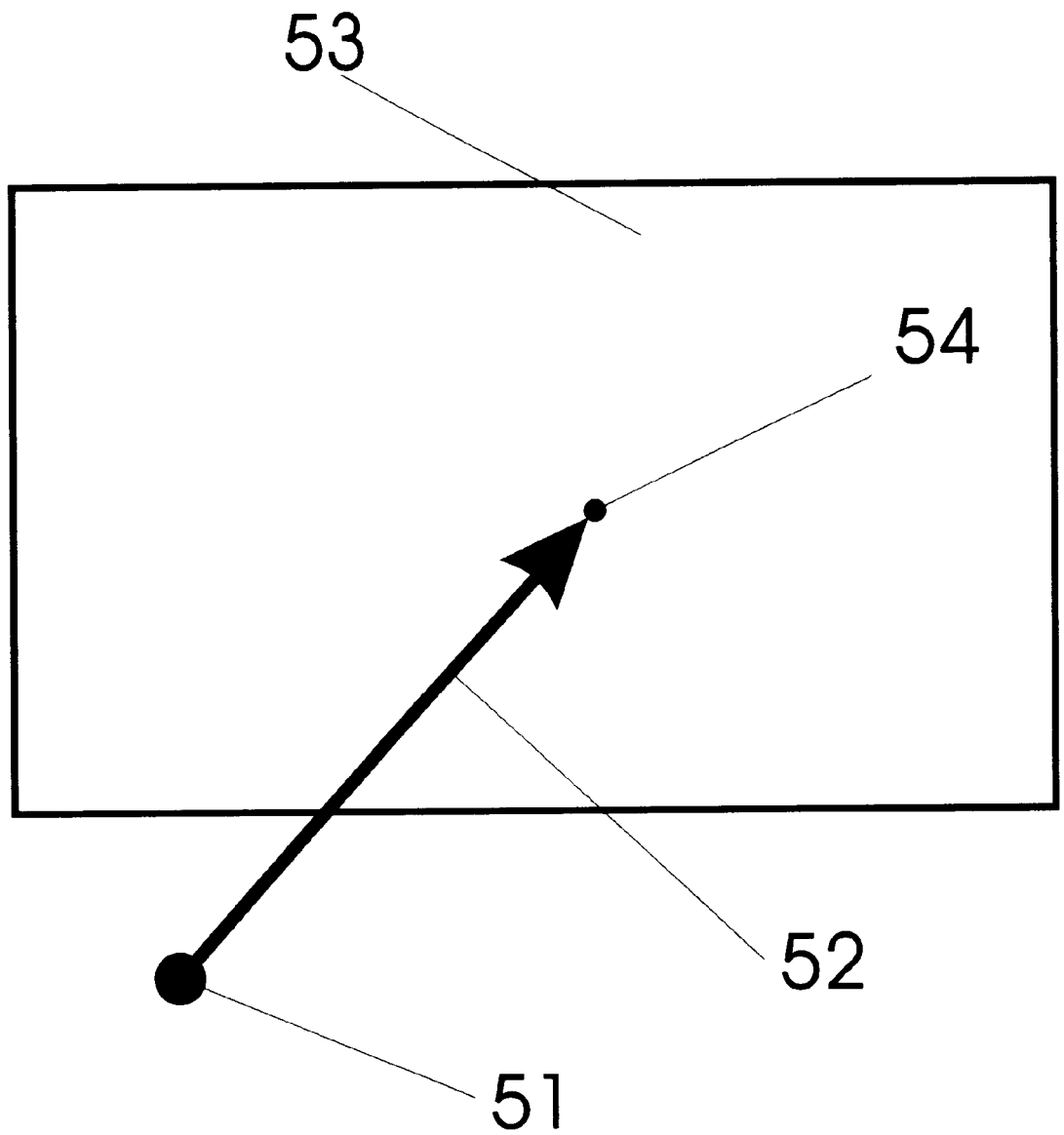

It is not a requirement that an object be three dimensional; quite contrarily, a two dimensional or single dimensional object forms perfect basis for an intersection with an address indicator in the form of a vector. FIG. 5 illustrates a point reference 51 and a direction reference 52 forming a vector which intersects a plane 53 at a single point 54. One might envisage every advertising billboard as a plane having position information associated with it. When programmed properly, these geometric definitions allow a device of the invention to know of any billboard anywhere. When pointed at a billboard the device can identify the advertiser and be made to respond by playing back information such as a product jingle, text information, video clips, et cetera. The connection between the billboard (object) and the geometric descriptor is made via the database where real objects are associated with geometric descriptors in preprogrammed data storage schemes.

Figure 6:
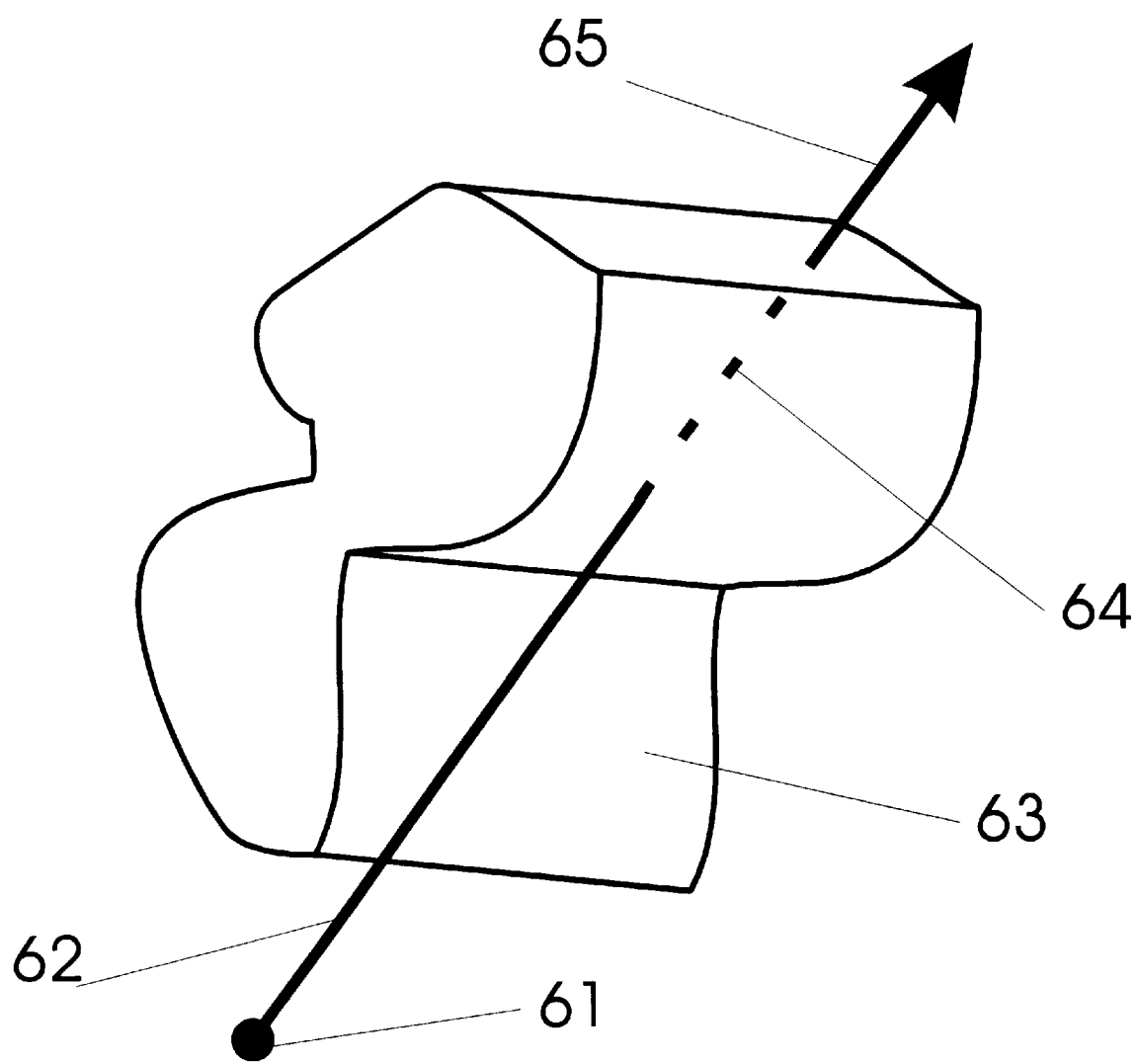

The shape does not necessarily have to be regular or "well-behaved". A geometric description is available for a complexly shaped element as well as those more readily described in simple terms. FIG. 6 shows a reference point 61 and reference direction 62 which define an address indicator in the form of a vector having an intersection with a spatial element 63 at line segment 64.

A geometric descriptor used in devices of the invention to associate object data with position and shape may change in time. Although the trains in Japan are moving objects, they move in a highly reliable way in accordance with a rigid schedule. Therefore, a geometric descriptor might include information about changes of position with respect to time. When a device of the invention is pointed at a moving train, inquiry to the database may yield an intersection with a 'moving' spatial element, i.e. an object having a position descriptor which is dynamic with respect to time.

Figure 7:
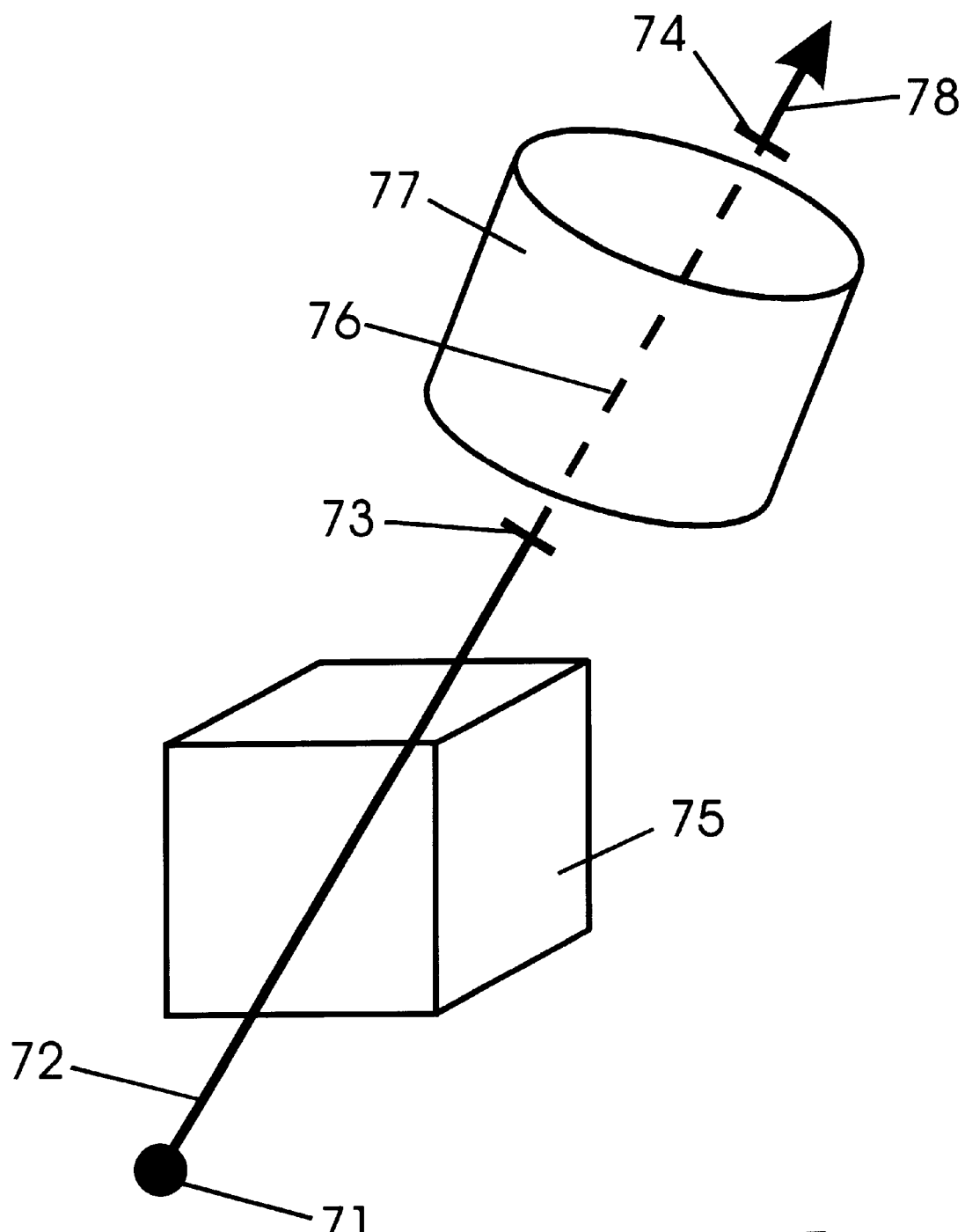

FIG. 7 shows an additional construction of interest. Although the term 'vector' implies a line segment with infinite extent in one direction, in some cases only a certain portion of the vector is of interest. Some operations described hereafter will refer to a "range gate". A range gate has two delimiters which define a portion of the vector which is of particular importance. FIG. 7 shows a reference point 71, a reference direction 72, a first delimiter 73 a second delimiter 74, a cube body 75, a line segment 76, a circular cylinder 77, and a vector 78. Although the vector 78 intersects and passes through both the cube body and the circular cylinder, only a portion of the vector in the range gate, i.e. that portion between delimiters 73 and 74, forms an intersection with the cube body. Thus, in some instances, a range gate is created to designate which portions of the vector are of greatest interest. Thus a user interface may present information regarding the cylinder and the cube but where information relating to the cube is presented with priority.

Figure 8:
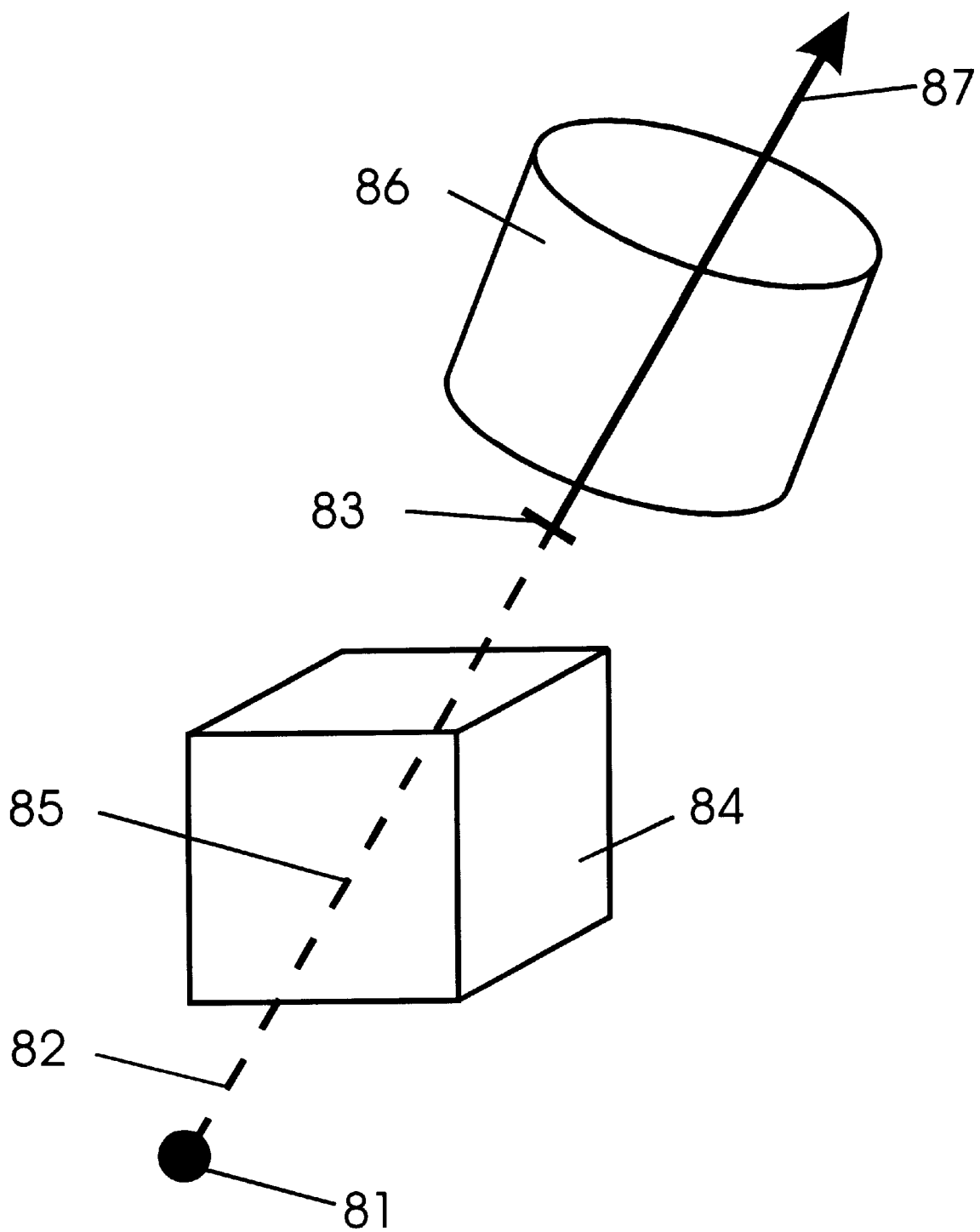

FIG. 8 shows another important range gate. A range gate may include all the points along a vector from the reference point to a selected maximum distance. For example a user may specify all targets "within fifty meters of the device". Objects which are greater than fifty meters away from the user are not included in any recall effort. FIG. 8 illustrates this concept. A reference point 81 and line segment 82 form basis for a system having a range gate starting at the reference point and ending 83 at some predetermined distance from the reference point. A cubic object 84 has a portion 85 of the vector passing through it. Similarly, circular cylindrical object 86 also has a portion of the vector intersecting that object. Of course, the vector 87 continues on without limit. The difference between the cubic object and the circular cylindrical object is that the cubic object lies within the range gate region of the address indicator and the circular cylindrical object does not. A computer search engine arranged to be responsive to criteria describing such a rate gate is useful in restricting objects which are presented.

Figure 9:
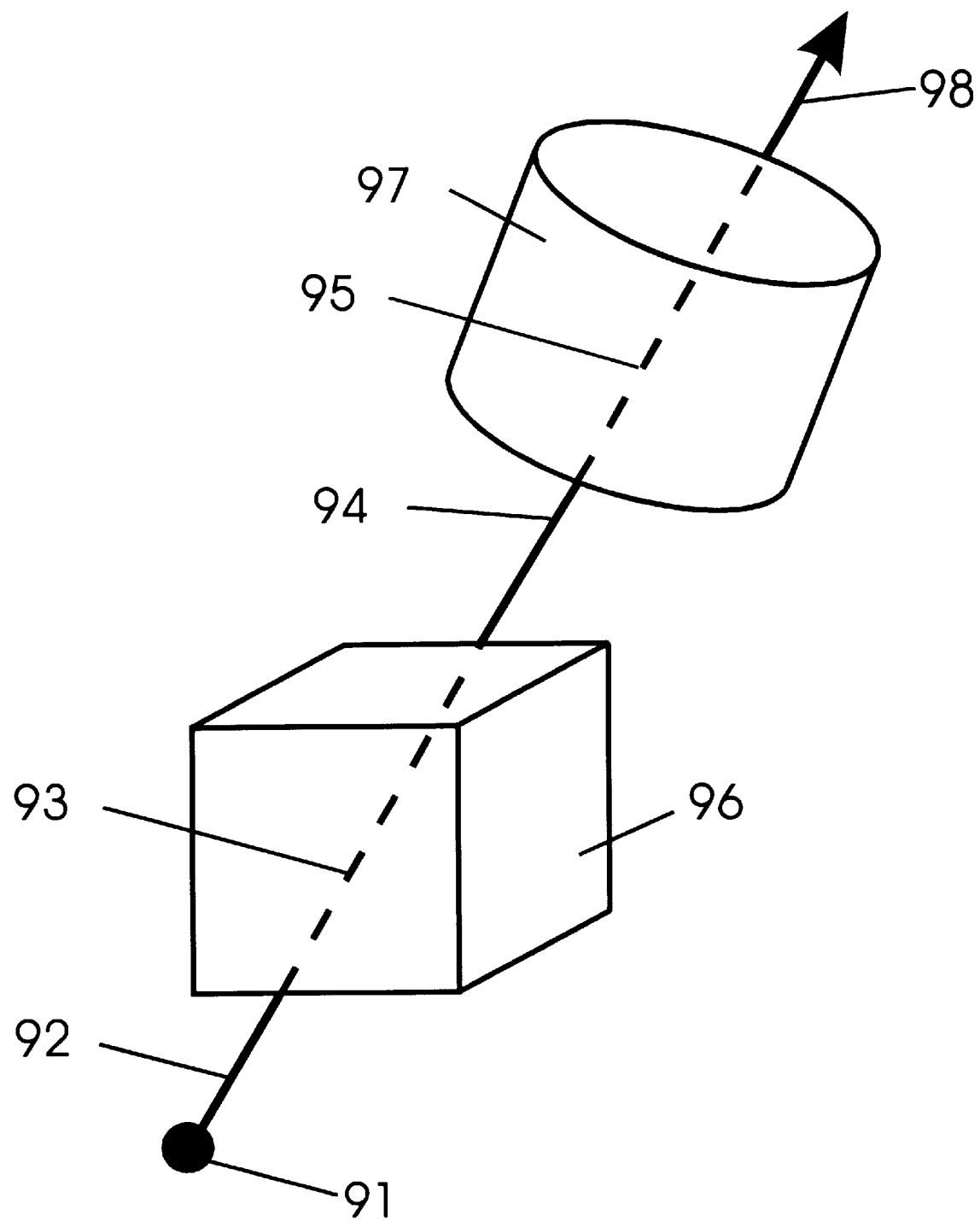

It is entirely possible that two objects fall within the limits of a particular range gate. FIG. 9 illustrates a reference point 91 and a direction vector 92 which passes through 93 a first object, continues through space 94 and passes through a second object 95. In this case, both objects a cubic object 96 and a circular cylindrical object 97 form an intersection with the vector and lie with a range which lies on the address indicator somewhere past the point indicated as 98. A search engine therefore identifies both objects as being addressed by the system. A display can handle this occurrence by listing all objects being addressed simultaneously. A list may include a scheme whereby closer objects are listed first while more distant objects appear nearer the end of the list. A user may select from the list an object of particular interest and request from the computer more information relating to that object.

Although the previous examples primarily use a vector for an address indicator, it is not necessary that an address indicator be in vector form. An address indicator may be any geometric construct including but not limited to: a point; a line; a vector; a line segment; a plane; a planar section; a cone; a conic section; et cetera. To determine intersection with objects of interest, the search criteria may simple determine if any point of an address indicator is shared with any point described in an information elements geometric descriptor.

Figure 10:
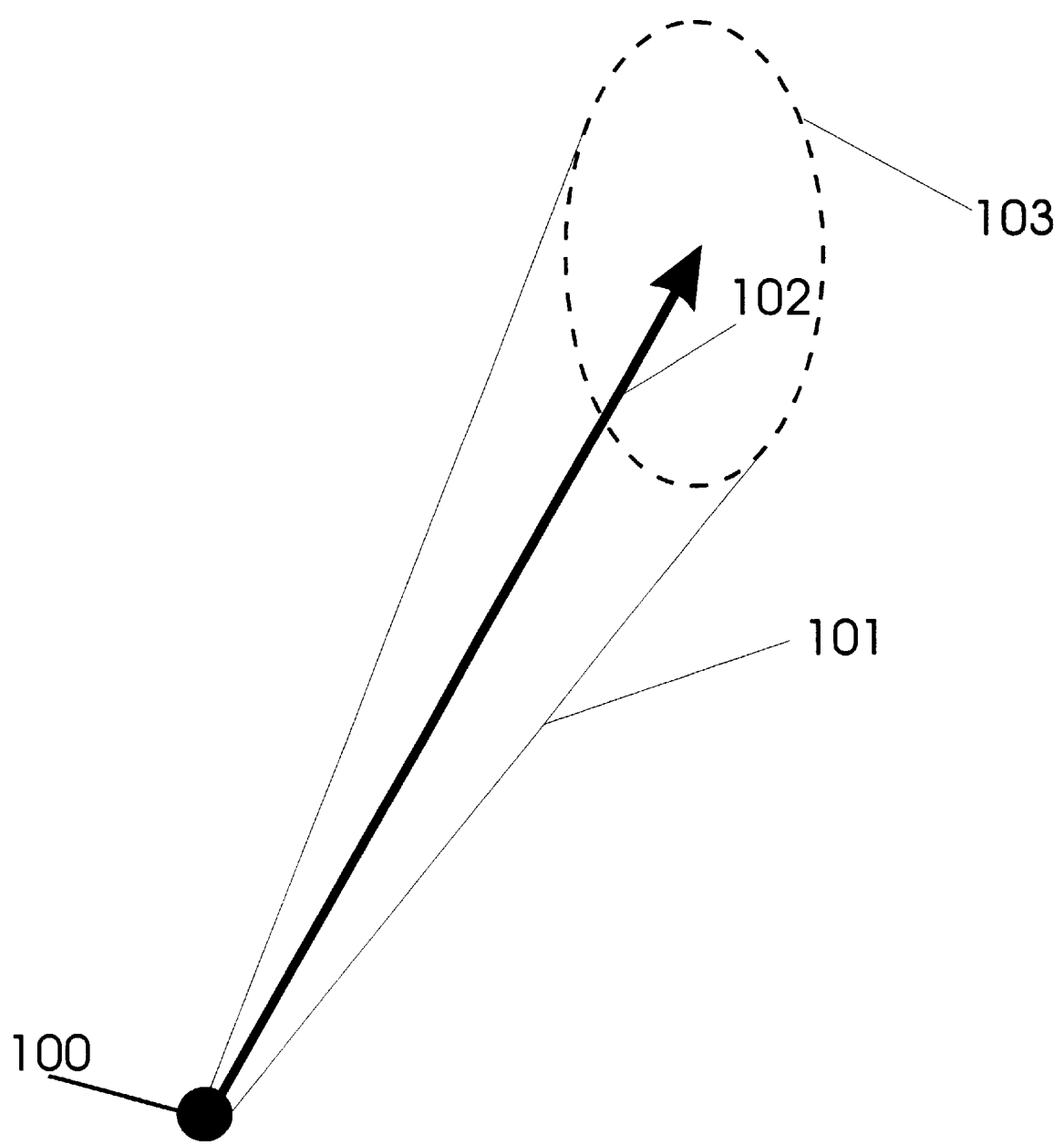

With reference to drawing FIG. 10, one will appreciate an address indicator which is in the shape of a cone. Reference point 100, is joined by a surface 101 which describes a cone having an axis 102. The conic axis may be arranged to be colinear with the system reference pointing direction. Although a cone may extend in space without limit, ellipse 103 is useful to indicate a cross section of the cone. The careful observer might argue that the "cone" shown is not truly a cone in the sense that it is wider in one dimension that in an orthogonal dimension. This loose interpretation of a cone is intended to illustrate that the geometric shape of an address vector may be of complex form.

Figure 11:
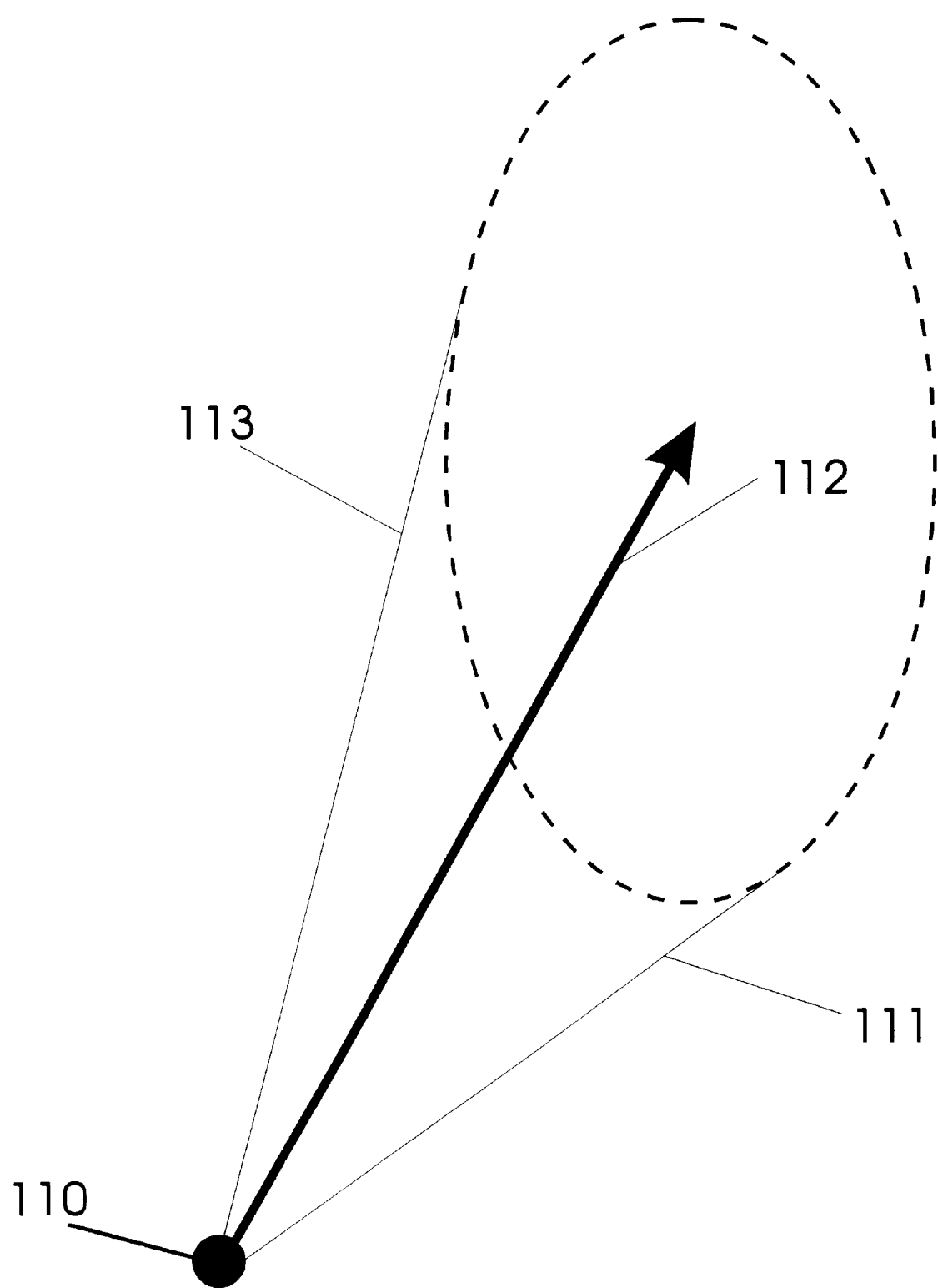

In some systems of the invention, it is useful to have an address vector which is adjustable. FIG. 11 shows a conic shape similar to that of FIG. 10 whereby the extent of the limiting surface has been increased. Reference point 110 forms the apex of a cone having a surface 111 which is quite portly in comparison to the cone of FIG. 10. The conic axis 112 is associated with the system pointing direction. Devices of the invention may include an adjustment setting which can be set by a user to alter the shape and size of an address indicator.

Figure 12:
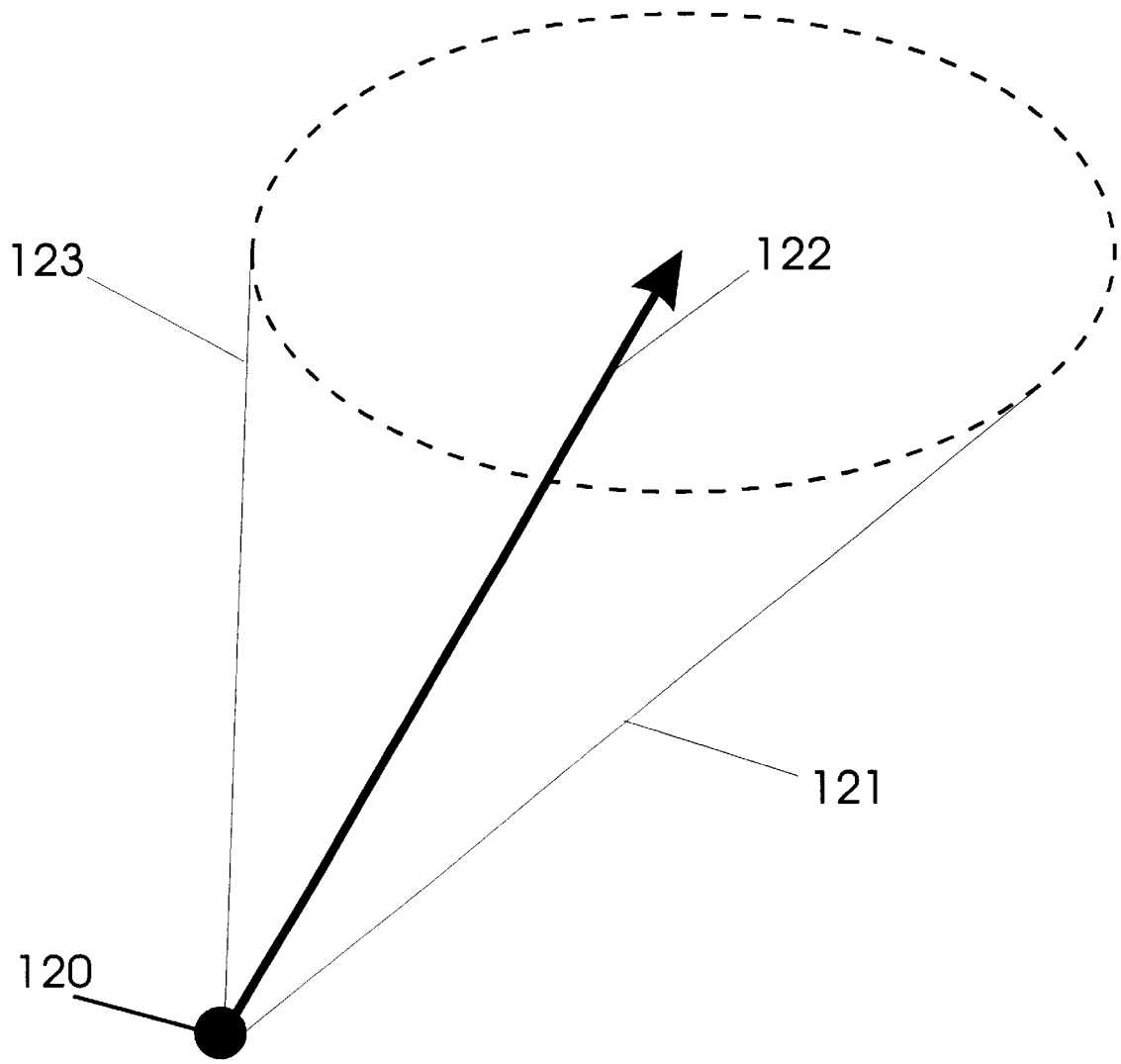

Such adjustment may be used to configure the address indicator to take a shape having a width which is greater in extent than its height. FIG. 12 shows a reference point 120 and address indicator surface 121 symmetric about pointing reference 122. One will readily appreciate the aspect ratio is different than those shown in prior figures.

Figure 13:
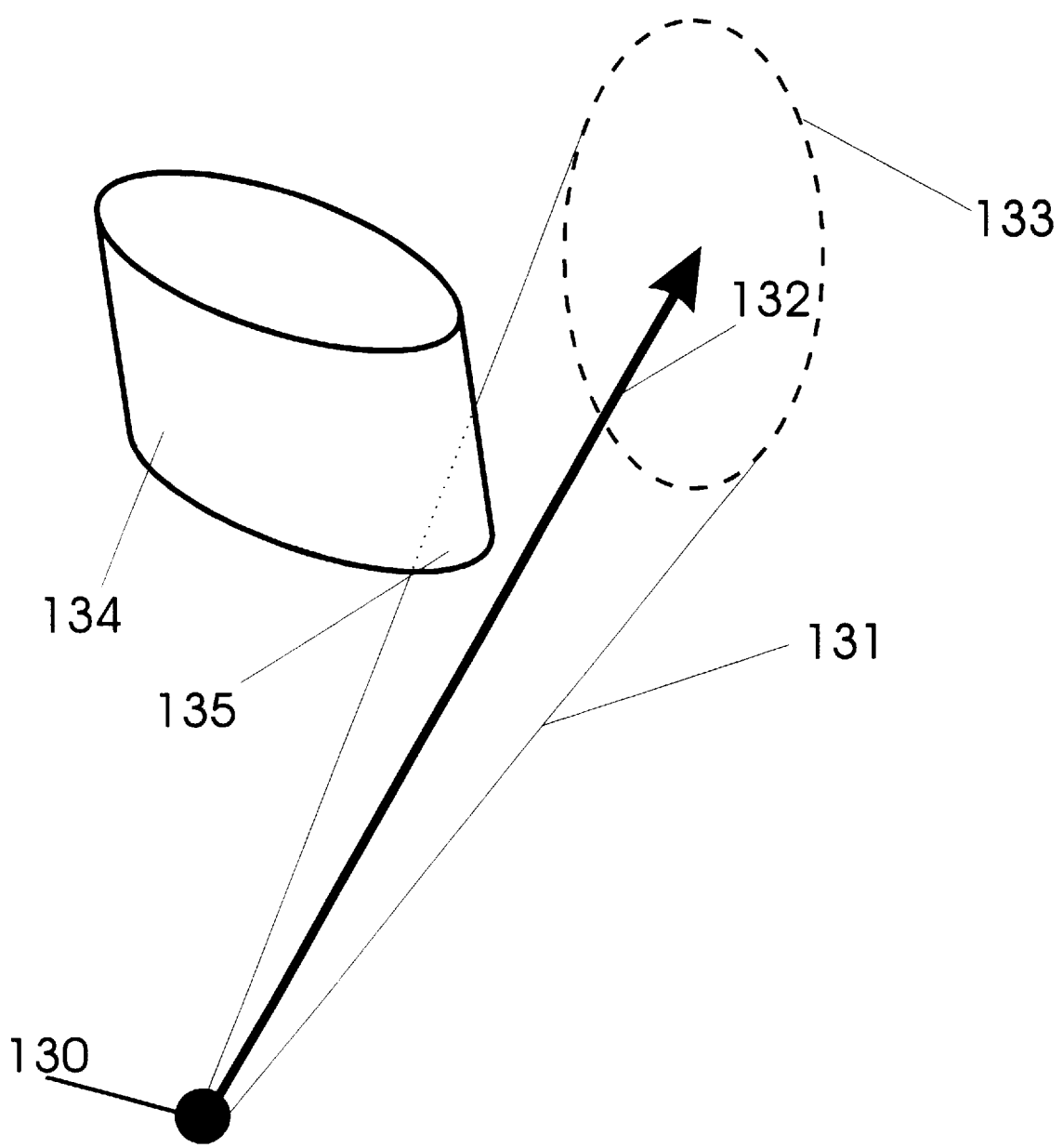

FIG. 13 shows how an address vector may be said to be intersecting an object. Reference point 130 is the apex of a conic address indicator having a surface 131 and a reference pointing direction 132 and cross section 133. Cylindrical object 134 contains spatial extent 135 which is shared with the address indicator. In this regard, it is said that a device of the invention having a conic address indicator as shown is addressing the object. One will appreciate that it is not necessary that the reference pointing direction be intersecting the object, but that any portion of the address indicator is sufficient to form an intersection. The database search can be made to be responsive to this condition.

Figure 14:
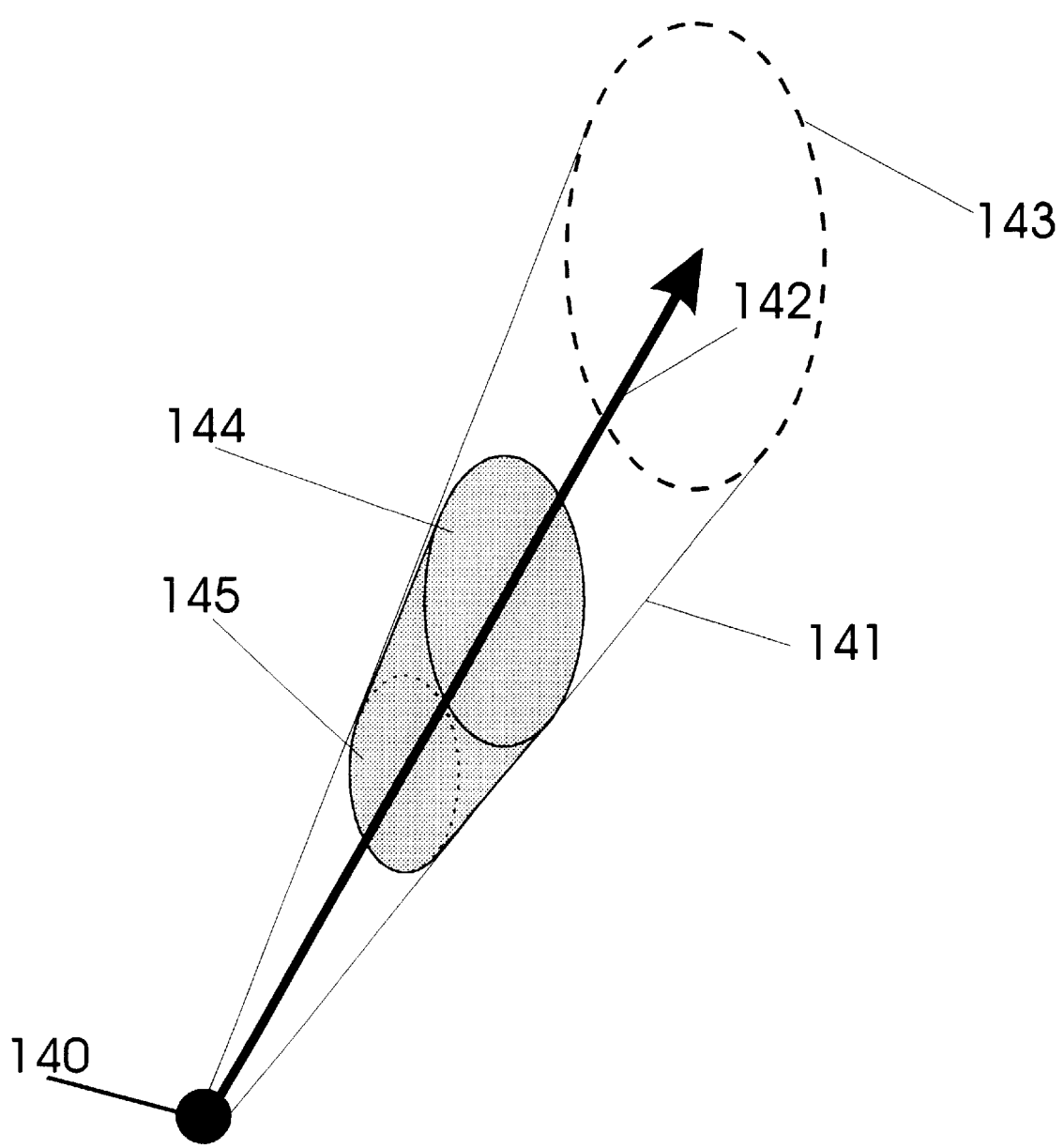

Range gates cooperate with address indicators having spatial extent. FIG. 14 shows a reference point 140, conic surface 141, pointing reference 142 and cross section 143. A conic section having cross sections 144 and 145 form a range gate which may be used to limit database searches.

Figure 15:
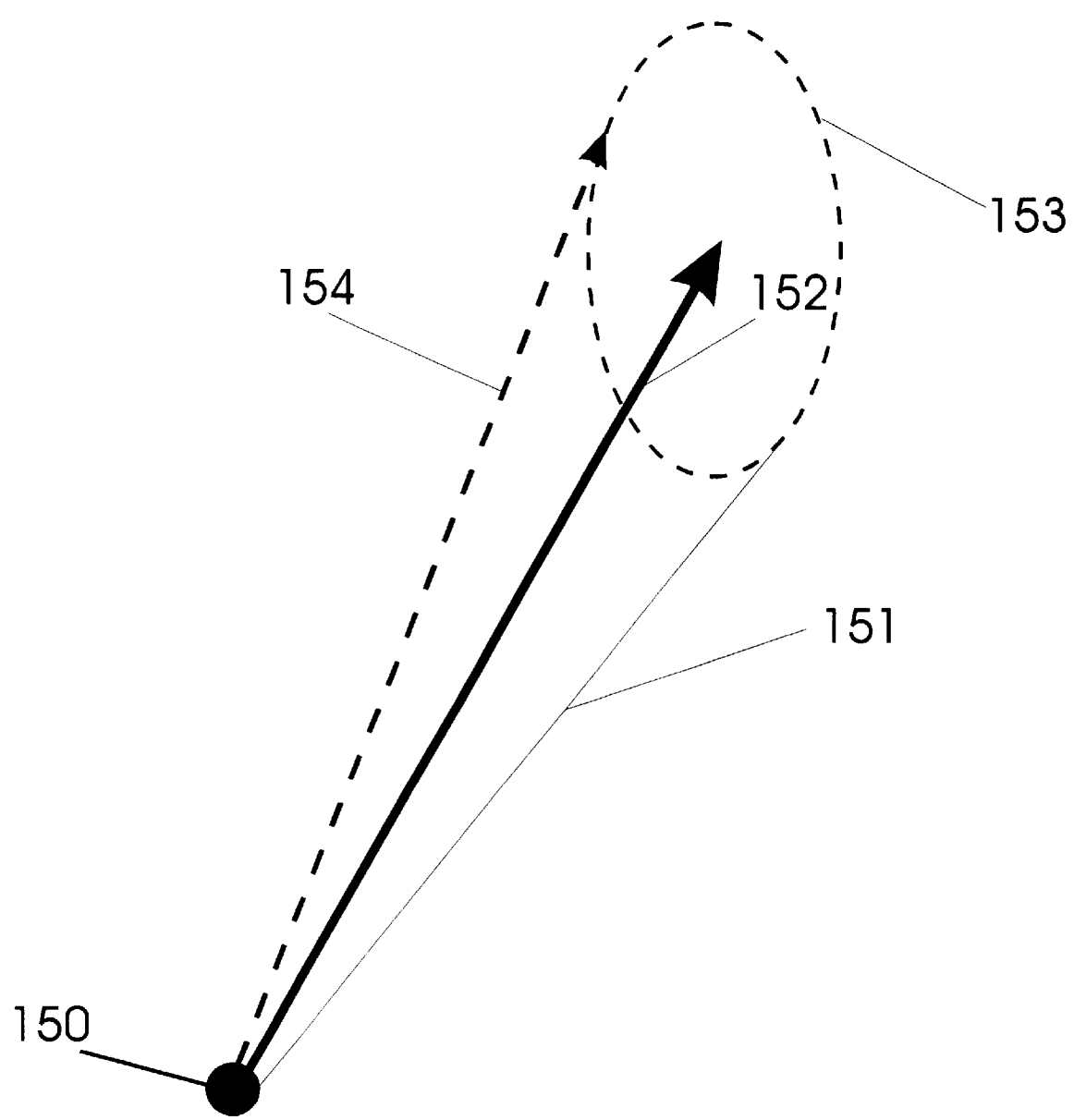

It is not necessary that a reference pointing direction be aligned with the geometric axis of an address indicator. FIG. 15 shows an example where a system reference pointing direction is not colinear with the axis of an address indicator. Reference point 150 is coupled with conic surface 151, axis 152, and cross section 153 to form a conic shaped address indicator. A system reference direction 154 on the surface of the cone may be used for system attitude measurements.

Of course with geometric shapes one might be quite liberal in devising various useful shapes. To be a valid address indicator, a geometric shape must merely have a reference point and reference pointing direction associated therewith.

One will now fully appreciate how a system which measures position and attitude may present information relating to objects having an association with a particular geometry and location. Although the present invention has been described in considerable detail with clear and concise language and with reference to certain preferred versions thereof including the best mode anticipated by the inventor, other versions are possible. Therefore, the spirit and scope of the invention should not be limited by the description of the preferred versions contained therein, but rather by the claims appended hereto.

What is claimed is:

1. An apparatus for the presentation of information relating to an object being addressed, the apparatus comprising:
   a directional reference;
   a point reference;
   a position determining means;
   an attitude determining means;
   a computer processor; and
   a user interface,
   said position determining means being arranged to determine the position of the point reference and convey position information to said computer processor;
   said attitude determining means being arranged to determine the orientation of the directional reference and convey attitude information to said computer processor; and
   said user interface being in electronic communication with said computer processor,
   said object being addressed being an object having information relating thereto stored in the computer and a geometric descriptor associated therewith,
   said geometric descriptor being a definition of a geometric body which may form an intersection with the directional reference.

2. An apparatus for the presentation of information relating to an object being addressed, the apparatus comprising:
   a directional reference;
   a point reference;
   a position determining means;
   an attitude determining means;
   a computer processor; and
   a user interface,
   said position determining means being arranged to determine the position of the point reference and convey position information to said computer processor;
   said attitude determining means being arranged to determine the orientation of the directional reference and convey attitude information to said computer processor; and
   said user interface being in electronic communication with said computer processor,
   the apparatus further comprising a plurality of information elements stored in the computer in a database, each information element comprising stored information relating to an object which may be addressed by the apparatus,
   said apparatus further comprising an address indicator, said address indicator being a definition of a geometric body being associated with said directional reference and point reference, whereby said address indicator may be caused to form an intersection with one or more geometric descriptors.

3. An apparatus of claim 2, said geometric body being a cone.

4. An apparatus of claim 2, said geometric body being a conic section.

5. An apparatus of claim 2, said geometric body being a conic section is arranged in accordance with a range gate definition.

6. A method of presenting information relating to an object being addressed, the method comprising the acts:
   addressing an object;
   determining position;
   determining attitude;
   searching a database; and
   presenting information,
   said addressing an object being further defined as causing a reference pointing direction to be aligned towards an object;

said determining position further defined as measuring the position of a point reference;

said determining attitude further defined as measuring the orientation of a directional reference;

said searching a database further defined as comparing an address indicator against a geometric descriptor of an information element; and said presenting information further defined as reporting results of a search where correlation is found, said address indicator being a geometric body which is associated with said directional reference pointing direction and said point reference, said geometric body being a cone.

7. A method of claim 6, said geometric body being a conic section.

8. A method of claim 6, said geometric body being a conic section arranged in accordance with a range gate.

* * * * *